United States Patent [19]
Cutkosky et al.

[11] Patent Number: 4,458,424
[45] Date of Patent: Jul. 10, 1984

[54] COMPLIANCE SYSTEM FOR INDUSTRIAL MANIPULATORS

[75] Inventors: Mark R. Cutkosky; Paul K. Wright, both of Pittsburgh, Pa.

[73] Assignee: Westinghouse Electric Corp., Pittsburgh, Pa.

[21] Appl. No.: 383,401

[22] Filed: Jun. 1, 1982

[51] Int. Cl.³ .............................................. G01B 5/25
[52] U.S. Cl. ................................. 33/185 R; 33/169 C
[58] Field of Search ............. 33/169 C, 185 R, 180 R, 33/181 R, 172 D, 174 Q; 29/406, 407; 403/53

[56] References Cited

U.S. PATENT DOCUMENTS

| | | | |
|---|---|---|---|
| 3,984,006 | 10/1976 | Kakeyasu et al. | 214/1 BB |
| 4,276,697 | 7/1981 | Drake et al. | 33/169 C |
| 4,283,153 | 8/1981 | Brendamour | 33/169 C X |
| 4,367,591 | 1/1983 | Hirabayashi | 33/169 C |

FOREIGN PATENT DOCUMENTS 2504127 9/1975 Fed. Rep. of Germany ........ 29/407
1450788 9/1976 United Kingdom .

Primary Examiner—Harry N. Haroian
Attorney, Agent, or Firm—T. R. Trempus

[57] ABSTRACT

A five and one-half degree of freedom adjustable compliance system exhibits a range of compliant control useful for large industrial manipulators which experience a range of tool lengths and payloads. Reinforced elastomeric spheres provide monotonically increasing spring stiffness and can automatically be adjusted for a desired stiffness range through pressurized fluid. Local position sensing of the robot gripper is achieved by linear variable-differential transformers. The output is analyzed by a microcomputer for possible readjustment of the manipulator.

13 Claims, 7 Drawing Figures

COMPLIANCE SYSTEM FOR INDUSTRIAL MANIPULATORS

BACKGROUND OF THE INVENTION

1. Field of the Invention

The invention is directed to industrial manipulators. More particularly, the invention is a compliance system which provides a range of compliant control. Additionally, the invention includes a system for directly and accurately measuring radial and axial deflections in the compliance system in order to provide positional information.

2. Description of the Prior Art

It is an objective in the design and construction of industrial manipulators to mimic limited aspects of various human capabilities in order to improve the positional accuracy of industrial manipulators in such tasks as the mating between two parts, a tool and a part, a part and a fixture, and many other mating pairs. When parts are of an exact nature and the tools and jigs holding them are precisely located, there are no errors in assembly. However, not all surfaces on a part are held to the same tolerance and often the mating surfaces are not in perfectly known positions. The design and construction of mechanical manipulators ultimately involves a compromise between manipulator speed, payload capacity and positional accuracy in order to cope with aforedescribed imperfections.

It has been known to utilize a compliant device as an aid in overcoming the imperfections encountered in mating operations. The compliant device addresses these difficulties by functioning as a multi-axis "float" which accommodates positional and angular misalignments between parts. U.S. Pat. No. 4,098,001 discloses a remote center compliance device which holds a workpiece so that the workpiece can rotate about the point where it engages a mating part. Lateral error and angular error are absorbed independently so that the workpiece is responsive to contact forces during insertion, and realignment with the insertion axis is passively accommodated.

It has also been suggested that sensory feedback utilizing vision or tactile devices be employed to facilitate the positional accuracy requirements of industrial manipulators. To this end, force sensing apparatus, which involve strain analysis, have been incorporated into compliance devices. An example of a force sensing apparatus capable of six degrees of freedom is disclosed in U.S. Pat. No. 4,094,192. However, in industrial applications, the response to the force sensor apparatus by large manipulators is usually not fast enough to prevent large forces from occurring. Therefore, a degree of mechanical compliance is added to make the manipulator system more forgiving.

It is an object of this invention to provide an adjustable compliance which is capable of a range of compliant control.

It is also an object of this invention to provide a compliance system with five and one-half degrees of freedom.

It is yet another object of this invention to produce positional feedback information.

It is yet another object of this invention to provide a compliant device which is capable of a variety of applications requiring a significant range of strength and precision.

SUMMARY OF THE INVENTION

The invention is a compliance system for an assembler device such as an industrial manipulator or robot. A range of compliant control in an adjustable compliance with five and one-half degrees of freedom includes a first member mounted on the assembler device and a second member to which a gripper or tool is secured. Interconnecting means restrict axial displacement of the second member away from the first member and biasing means disposed therebetween inhibit axial compression. Biasing means are also provided to inhibit radial displacement of the second member relative to the first member. The axial biasing means are reinforced elastomeric spheres which exhibit monotonically increasing spring stiffness and can be automatically adjusted for stiffness range using a pressurized fluid. Local position sensing of the gripper is provided through an array of linear variable-differential transformers. A dedicated microcomputer provides signal analysis for possible readjustment of the manipulator.

BRIEF DESCRIPTION OF THE DRAWINGS

The above as well as other features and advantages of this invention will become apparent through consideration of the detailed description in connection with the accompanying drawings in which.

DESCRIPTION OF THE PREFERRED EMBODIMENT

Figure 1:
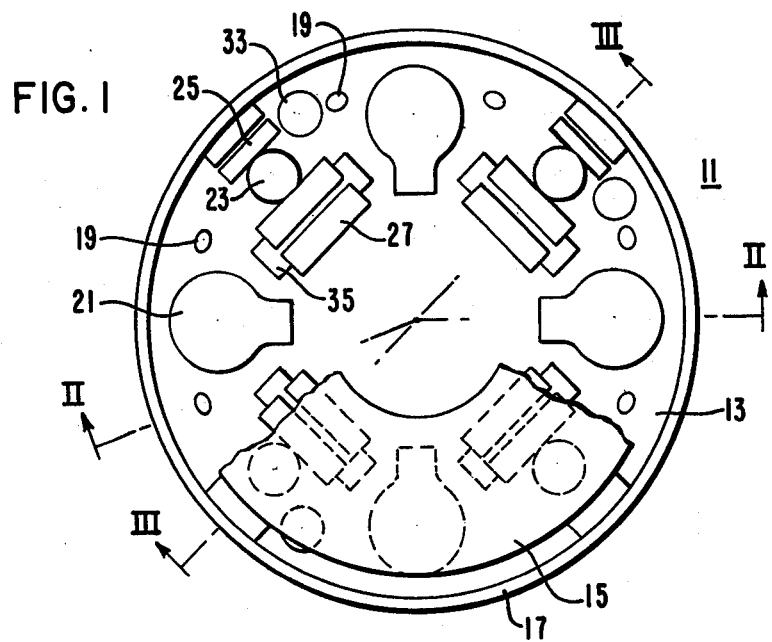
FIG. 1 is a bottom plan view of a compliance system with portions cut away incorporating the features of this invention.
Figure 2:
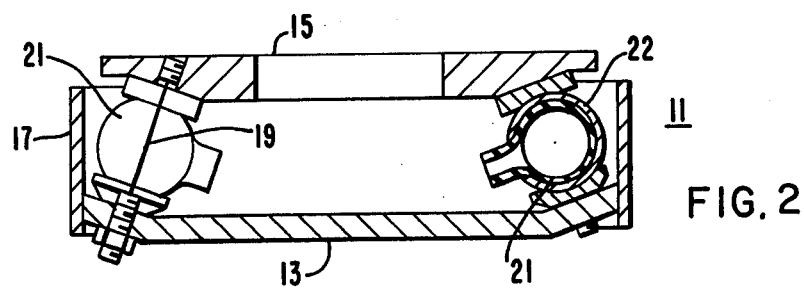
FIG. 2 is a section through FIG. 1 along lines II—II.
Figure 3:
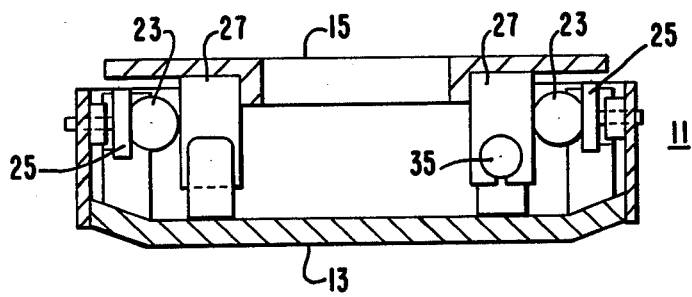
FIG. 3 is a section through FIG. 1 along lines III—III.

The invention is a compliance system for industrial manipulators and includes a remote center compliance capable of a range of compliance control. Specifically, the position of the compliance center is variable to meet differing payload and positional accuracy requirements. In FIGS. 1 through 3, the remote center compliance (RCC) is generally indicated by the reference character 11 and includes a first member 13 which is mounted on the control arm of an industrial manipulator and a second member 15 to which the gripper device of the manipulator is connected. A continuous flange 17 is circumferentially disposed about the first member 13 and is normal to the planar component of the first member 13. Interconnecting means 19 extend between the first and second members, 13 and 15 to restrict axial displacement of the second member 15 away from the first member 13 to a predetermined maximum limit. However the interconnecting means 19 do not interfere with the compressive axial displacement of the second member 15 towards the first member 13. A material particularly well suited for use as an interconnecting means is characterized by a high degree of tensile resistivity coupled with compressive flexibility. An example of such a material is a stranded fiber cable commercially available under the trademark "KEVLAR" which is registered to DuPont.

First biasing means are interposed between the first and second members 13 and 15 to control the aforementioned compressive axial displacement. These axial biasing means are elastomeric spheres 21 that resist compression but offer little resistance to lateral displacement because of their spherical shape. Each elastomeric sphere 21 is a hollow rubber sphere, preferably reinforced by an outer layer 22 of flexible cable or fabric such as "KEVLAR" cable and filled with a fluid to maintain the sphere at a predetermined level of stiffness. In other words, the internal pressure of the elastomeric spheres can be varied with a suitable fluid supply in order to change the effective spring stiffness of the spheres. As will be hereinafter more fully explained, the compliance center of the RCC 11 can be modified through a variance of the spring stiffness of the spheres 21. While the fluid utilized to control the internal pressure of the spheres 21 can be water or even air, it is preferred that a highly viscous fluid be utilized to provide a damping effect on the movement of the second member 15 relative to the first member 13. While it is preferred that hollow elastomeric spheres be used, solid elastomeric spheres with a fixed rate of stiffness can be used in a passive compliance system.

Second biasing means 23 are disposed between the circumferentially disposed flange 17 and the second member 15 by means of mounting seats 25 and 27. The second biasing means 23 controls radial displacement of the second member 15 relative to the first member 13 and consists of several spherical members which function as fixed rate springs. The spherical members can be solid rubber spheres or hollow spheres pressurized to a predetermined value. Because of the spherical shape, the second biasing means 23 offers minimal resistance to relative axial displacement of the first and second members 13 and 15.

Figure 4:
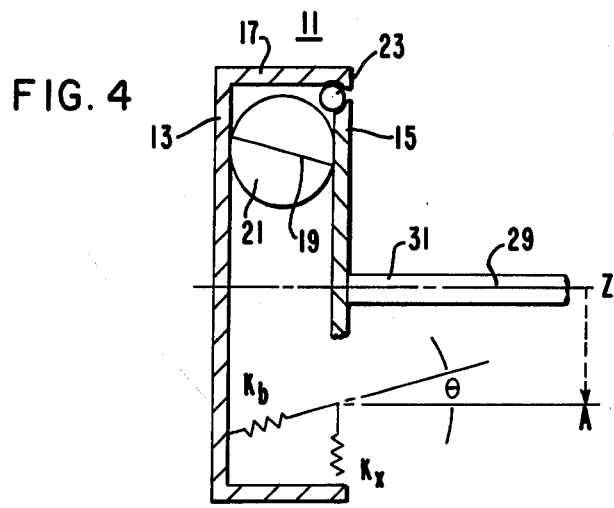
FIG. 4 is a simplified schematic representation of the instant compliance system.

Considering FIG. 4, it will be readily appreciated that the adjustability of the first biasing means or spheres 21 makes it possible to modify the position of the compliant center with respect to the RCC 11. As a result, a range of compliant control is available in one unit. By way of a brief review, the remote center 29 is a point projected onto the gripper or tool mounted on the second member 15. (For illustrative purposes, the gripper is shown as an elongated member 31.) Since the remote center 29 is known, its behavior under various axial and lateral error conditions is determinable. The location of the remote center 29, a distance $l_1$ from the second member 15, is a function of $k_x$, $k_b$ and $\theta$; $k_x$ is the shear force, $k_b$ is the axial force along an angle defined by $\theta$, and $\theta$ is the angle representing the difference between the disposition of the cable 19 and the Z axis or axial centerline "z" of the compliance as projected by line "a".

The specific benefits obtained through the ability to alter the remote center 29 by changing $l_1$ are reflected by an increase to both the range of payloads and positional accuracy which can be accommodated by the single RCC 11. For example, if the industrial manipulator engages a longer and heavier payload, an increase in $l_1$ is warranted. Also, an increase in $k_x$ and $k_b$ is indicated. If the angle $\theta$ remains constant, the length $l_1$ is a function of the ratio $k_b/k_x$. The length $l_1$ can thus be increased by either increasing $k_b$ or decreasing $k_x$. By increasing $k_b$, there is a collateral benefit in the increase to the bending stiffness of the RCC 11. Such an increase is better suited to the larger forces and moments imposed by a longer and heavier payload.

According to this invention, the value $k_b$ of the spherical members which make up the first or axial biasing means 21 can be increased or decreased by adjusting the internal pressure of the spherical members with a suitable fluid supply. As a result, the effective spring stiffness of the spherical members 21 is changed and the position of the remote center 29 is altered.

Figure 5:
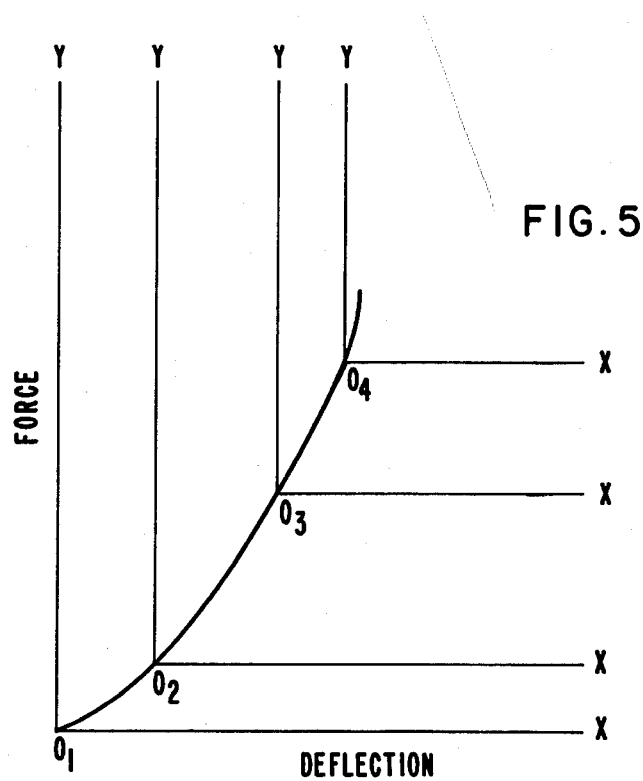
FIG. 5 is a graph representing the force deflection curve in a compliance device according to this invention.

The force deflection graph of FIG. 5 typifies the range of compliant control made available through the apparatus of this invention. Because the force-deflection curve is non-linear, a range of operating stiffness results. The Y axis of the graph reflects an increase in the total load suspended from the RCC 11. By total load it is meant the combination of the gripper and the payload being manipulated thereby. The X axis reflects the amount of deflection experienced by the RCC 11 per a constant unit of force. Several different load conditions are each reflected through individual origins $O_1$, $O_2$, $O_3$ and $O_4$. Each of the origins successively represents an increased value of $k_b$ in the spherical members 21. Thus, for example, the deflection experienced by the RCC 11 with an increased value of $k_b$ and an increased payload at a given level of force is less than the deflection experienced by the RCC 11 with $k_b$ at a lesser value and with a smaller payload at the same level of force. Also, with a constant payload, the value of $k_b$ can be manipulated to control the force sensitivity and the degree of deflection per unit of force in the RCC 11.

Figure 6:
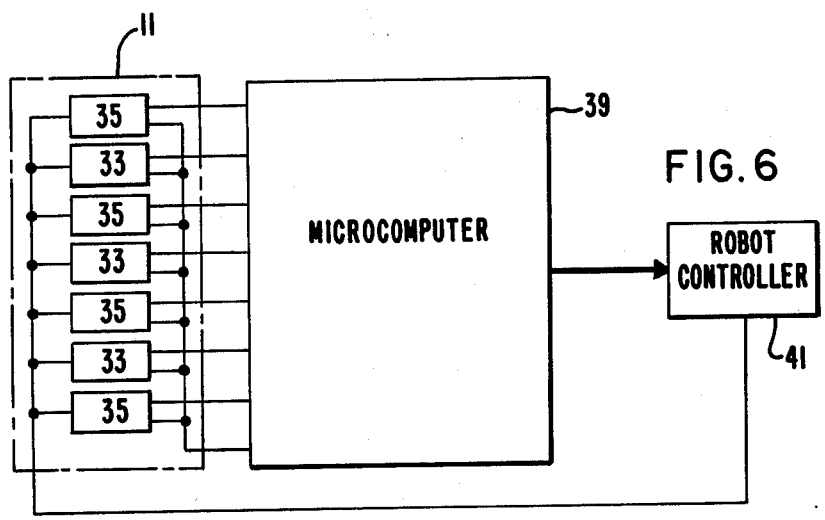
FIG. 6 is a block diagram analysis of the positional feedback system of this invention.

An additional feature of this invention is position measurement through the RCC 11. As shown in FIGS. 1 and 6, position information is produced through a series of linear variable-differential transformers (LVDT transducers) 33 and 35. Deflections of the second member 15 relative to the first member 13 of the RCC 11 are measured directly and accurately by the LVDT transducers 33 and 35. At least three LVDT transducers 33 are normal to the first and second members 13 and 15 in order to detect any axial displacement or change in the orientation of the second member 15 relative to the first member 13. The LVDT transducers 35 are disposed between the first and second members 13 and 15 to detect any radial displacement and rotation about the Z axis therebetween. The LVDT transducers 33 can be mounted on the second member 15 and a reference member 37 in contact with the cores thereof provided on the first member 13. At least three and preferably four LVDT transducers 35 are utilized to detect radial displacement. The signal from each LVDT transducer (33 and 35) enters a microcomputer 39 to produce a floating point array and eventually an error signal. Once the deflections of the compliant point are calculated, explicit commands for modifying the coordinates of the gripper's path can be produced. For example, in a point-to-point industrial manipulator, the modifications take the form of discrete point motions effected through the controller 41.

Figure 7:
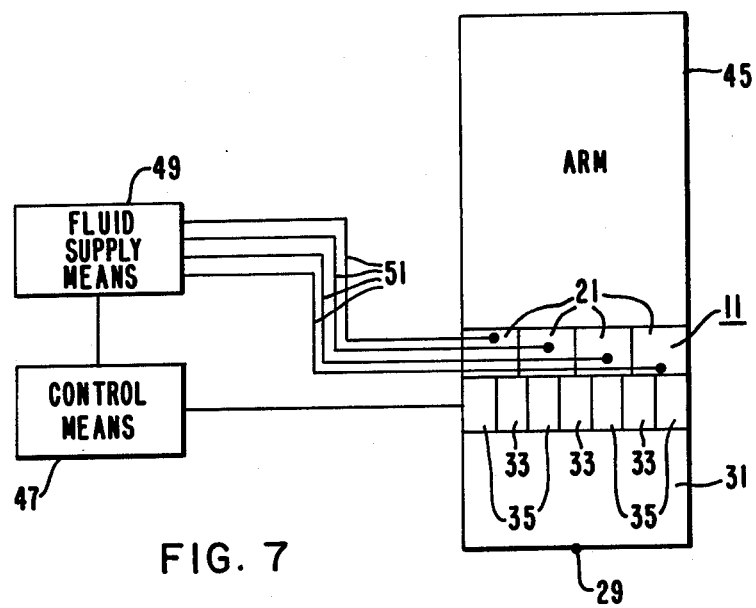
FIG. 7 is a block diagrammatic illustration of the mechanical programmability system of this invention.

In FIG. 7 a system for the manipulation of the value of $k_b$ through the pressurization of the several spherical members 21 lends the RCC 11 a degree of mechanical programmability. Because a fluid is used to stiffen the compliant spheres, the pressure can be varied automatically. The RCC 11 is mechanically mounted between the gripper 31 and the manipulator arm 45. In many applications, the gripper and arm are horizontally oriented relative to the task being performed. When horizontally disposed, the dead weight of the gripper 31 may be sufficient to create a force vector generally normal to the Z axis. As a result, the remote center 29 can deviate from its "null" state, that is, the position of the remote center 29 when the arm 35 and gripper 31 are vertically disposed. Through the individual adjustment of the spherical members 21, this deviation of the remote center 29 can be substantially corrected.

The output signals of the LVDT transducers 33 and 35 can be utilized to identify any deviation of the remote center due to the disposition of the gripper. A processing/control means 47 which is responsive to this output signal, is in communication with a fluid supply means 49 having a pump means and a fluid reservoir. Separate pump or valve means can be provided to regulate the fluid flow through the separate lines 51 to each elastomeric sphere 21. The fluid supply means 49 operates to either increase or decrease individually the pressure of the fluid in each of the spherical members 21. By adjusting the value of $k_b$ through fluid pressure modification, the remote center 29 is reoriented.

The output signal of the LVDT transducers 33 and 35 can also be utilized to identify the payload being manipulated by the gripper, so that the proper range of compliant control is provided through selective pressurization of the spheres.

It should be appreciated that in many applications an increase in the physical dimensions of the payload is generally reflected by an increase in weight. However in certain circumstances, the payload length can increase while its weight remains the same or even decreases. Accordingly, while a sensor means consisting of LVDT transducers 33 and 35 illustrated herein is responsive to payload weight through deflection of the second member 15, other sensor means responsive to the physical configuration of the payload being manipulated can be utilized in this system. A linear diode array is one example of such a sensor means which can be adapted for use with the mechanical programmability system of this invention.

Of course, the RCC 11 need not be provided with the automatic mechanical programmability feature described above. In applications in which the payload is relatively constant, the fluid pressure of the spherical members 21 can be set to a predetermined level for the duration of that specific application. With a relatively constant payload, solid spherical members, with or without a Kevlar cord reinforcement, can be used.

What has been described is a compliance system for industrial manipulators in which a range of compliant control is available in a single unit. Additionally, the compliance system is instrumented with an LVDT transducer array, which makes possible further position adjustment of the manipulator and gripper through a controller. The adjustable compliance exhibits five and one-half degrees of freedom; only axial expansion is restricted to a predetermined limit.

We claim:
1. A remote center compliance system which defines a remote center for an assembler device comprising:
    a first member fixed to said assembler device;
    a second member;
    means interconnecting said first member with said second member, said interconnecting means restricting axial displacement of said second member from said first member to a predetermined limit and consisting of a material characterized by tensile resistivity and compressive flexibility;
    first biasing means comprising a plurality of spherical members interposed between said first and second members, said first biasing means inhibiting compressive, axial displacement of said second member relative to said first member; and
    second biasing means comprising a plurality of spherical members interposed between said first and second members, said second biasing means inhibiting radial displacement of said second member relative to said first member.

2. The remote center compliance system according to claim 1 wherein the second biasing means consists of a plurality of spherical members each of which is disposed in a mounting means, a portion of said mounting means being associated with the first member and a further portion of which is associated with the second member, whereby radial displacement of said first and second members is inhibited and whereby said mounting means permit movement of said spherical members during axial displacement of said first and second members.

3. The remote center compliance system of claim 1 wherein the spherical members are solid elastomeric spheres.

4. The remote center compliance system of claim 1 wherein the spherical members which comprise the first biasing means are hollow, elastomeric spheres pressurized to a selectable value of spring-like stiffness, whereby the position of the remote center is a function of said selected value.

5. The remote center compliance system of claim 4 wherein the selectable value to which the spherical members are pressurized is variable and the position of the remote center is variable therewith, whereby said pressurized spherical members exhibit a monotonically increasing spring stiffness with increased pressure, thus rendering a range of compliant control.

6. The remote center compliance system of claim 4 including means to detect relative axial and radial displacement of the first member relative to the second member, said detecting means providing a signal indicating the position of the remote center as reflected by said radial and axial displacement.

7. The remote center compliance system of claim 6 wherein the means to detect relative axial and radial displacement is a plurality of linear variable differential transformers.

8. The remote center compliance system of claim 5 wherein the position of the remote center is determined by the demand requirements of the payload being manipulated by the assembler device and wherein said system includes sensor means responsive to the demand requirements; means to adjust the pressure in the pressurized spherical members and control means responsive to said sensor means, for actuating said pressure adjustment means.

9. The remote center compliance system of claim 8 wherein the pressure adjustment means selectively pressurizes each of the spherical members.

10. The remote center compliance system of claim 9 wherein the spherical members are pressurized with a viscous fluid to effect damping in the movement of the second member relative to the first member.

11. The remote center compliance system of claim 1 including means to detect relative axial and radial displacement of the first member relative to the second member, said detecting means providing a signal indicating the position of the remote center as reflected by said radial and axial displacement.

12. The remote center compliance system of claim 11 wherein the means to detect relative axial and radial displacement as a plurality of linear variable differential transformers.

13. The remote center compliance system of claim 4 wherein the spherical members are pressurized with a viscous fluid to effect damping in the movement of the second member relative to the first member.

* * * * *